United States Patent
Höfig et al.

(10) Patent No.: US 10,241,852 B2
(45) Date of Patent: Mar. 26, 2019

(54) AUTOMATED QUALIFICATION OF A SAFETY CRITICAL SYSTEM

(71) Applicants: Kai Höfig, München (DE); Marc Zeller, München (DE)

(72) Inventors: Kai Höfig, München (DE); Marc Zeller, München (DE)

(73) Assignee: Siemens Aktiengesellschaft, München (DE)

( * ) Notice: Subject to any disclaimer, the term of this patent is extended or adjusted under 35 U.S.C. 154(b) by 142 days.

(21) Appl. No.: 14/644,119

(22) Filed: Mar. 10, 2015

(65) Prior Publication Data

US 2016/0266952 A1    Sep. 15, 2016

(51) Int. Cl.
  *G06F 11/00* (2006.01)
  *G06F 11/07* (2006.01)

(52) U.S. Cl.
  CPC ............ *G06F 11/079* (2013.01); *G06F 11/00* (2013.01); *G06F 11/004* (2013.01); *G06F 11/0736* (2013.01); *G06F 11/0751* (2013.01)

(58) Field of Classification Search
  CPC ............... G06F 11/079; G06F 11/0736; G06F 11/0751; G06F 11/00; G06F 11/004
  See application file for complete search history.

(56) References Cited

U.S. PATENT DOCUMENTS

| | | | | |
|---|---|---|---|---|
| 4,870,575 A * | 9/1989 | Rutenberg | ............... | G06F 11/00 716/136 |
| 5,109,380 A * | 4/1992 | Ogino | ................. | G06F 11/2257 706/913 |
| 5,369,756 A * | 11/1994 | Imura | .................... | G06F 11/321 706/914 |
| 5,581,694 A * | 12/1996 | Iverson | ............... | G06F 11/2257 706/53 |
| 5,586,252 A * | 12/1996 | Barnard | .............. | G06F 11/2273 714/48 |
| 7,379,846 B1 * | 5/2008 | Williams | .............. | G06F 11/079 702/183 |
| 7,516,025 B1 * | 4/2009 | Williams | ........... | G05B 23/0278 702/182 |
| 7,681,086 B2 * | 3/2010 | Vlassova | ............ | G06F 17/5009 700/177 |
| 8,364,626 B2 * | 1/2013 | Heilmann | .......... | G05B 23/0248 706/47 |

(Continued)

OTHER PUBLICATIONS

Kaiser B, Liggesmeyer P, Mäckel O. A New Component Concept for Fault Trees. Oct. 1, 2003. InProceedings of the 8th Australian Workshop on Safety Critical Systems and Software. vol. 33. pp. 37-46.*

Kaiser, B. A Fault-Tree Semantics to model Software-Controlled Systems. 2003. Softwaretechnik-Trends. vol. 23.*

(Continued)

*Primary Examiner* — Paul Contino
(74) *Attorney, Agent, or Firm* — Lempia Summerfield Katz LLC (57) ABSTRACT

A method for automated qualification of a safety critical system including a plurality of components is provided. A functional safety behavior of each component is represented by an associated component fault tree element. The method includes automatically performing a failure port mapping of output failure modes to input failure modes of component fault tree elements based on a predetermined generic fault type data model stored in a database.

23 Claims, 6 Drawing Sheets

(56) References Cited

U.S. PATENT DOCUMENTS

| | | | | |
|---|---|---|---|---|
| 2003/0028823 | A1* | 2/2003 | Kallela | G05B 23/0278 714/26 |
| 2005/0160324 | A1* | 7/2005 | Przytula | G06N 7/005 714/43 |
| 2007/0150772 | A1* | 6/2007 | Berenbach | G06F 11/2257 714/25 |
| 2007/0225948 | A1* | 9/2007 | Takezawa | G06F 17/50 703/1 |
| 2008/0300946 | A1* | 12/2008 | Clark | G06Q 10/06 705/7.12 |
| 2009/0083576 | A1* | 3/2009 | Vlassova | G06F 17/5009 714/26 |
| 2009/0106593 | A1* | 4/2009 | Bluvband | G06F 11/008 714/37 |
| 2009/0113247 | A1* | 4/2009 | Gofuku | G05B 17/02 714/37 |
| 2010/0100251 | A1* | 4/2010 | Chao | G05B 23/0245 700/292 |
| 2010/0179847 | A1* | 7/2010 | Cope | G06Q 10/06311 705/7.28 |
| 2010/0262867 | A1* | 10/2010 | Bell | G06F 11/008 714/40 |
| 2013/0073271 | A1* | 3/2013 | Xiang | G05B 23/0248 703/6 |
| 2013/0317780 | A1* | 11/2013 | Agarwal | G05B 23/0248 702/181 |
| 2014/0201565 | A1* | 7/2014 | Candea | G06F 11/079 714/6.2 |
| 2015/0142402 | A1* | 5/2015 | Ramesh | G06F 17/5009 703/7 |
| 2015/0168271 | A1* | 6/2015 | He | G05B 23/0248 702/183 |
| 2016/0096633 | A1* | 4/2016 | Guibert | G05B 23/0278 701/31.8 |

OTHER PUBLICATIONS

Kaiser, B. et al. State/event fault trees—A safety analysis model for software-controlled systems. Jan. 12, 2007. Reliability Engineering and System Safety 92. Elsevier Ltc. pp. 152-1537.*

Joshi, A. et al. Automatic Generation of Fault Trees from AADL Models. Jun. 2007. Workshop on Architecting Dependable Systems.*

Willie, Randall R. Computer-Aided Fault Tree Analysis. Aug. 1978. Operations Research Center University of California Berkeley.*

Rae, Andrew et al. A Behaviour-Based Method for Fault Tree Generation. 2004. Proceedings of the 22nd International System Safety Conference. pp. 289-298.*

Yakymets N, Jaber H, Lanusse A. Model-based System Engineering for Fault Tree Generation and Analysis. InMODELSWARD 2013 (pp. 210-214).*

Mhenni F, Nguyen N, Choley JY. Automatic fault tree generation from SysML system models. InAdvanced Intelligent Mechatronics (AIM), 2014 IEEE/ASME International Conference on Jul. 8, 2014 (pp. 715-720).*

Assaf T, Dugan JB. Automatic generation of diagnostic expert systems from fault trees. InReliability and Maintainability Symposium, 2003. Annual 2003 (pp. 143-147).*

Dehlinger J, Dugan JB. Analyzing dynamic fault trees derived from model-based system architectures. Nuclear Engineering and Technology. 2008;40(5):365-74.*

Gómez, Carolina, Peter Liggesmeyer, and Ariane Sutor. "Variability management of safety and reliability models: an intermediate model towards systematic reuse of component fault trees." Computer Safety, Reliability, and Security (2010): 28-40.*

Fault Tree Analysis a Bibliography. National Aeronautics and Space Administration. Jul. 2000.*

Peterson Kurt E., Rasmussen, Birgitte. Safety and Reliability '92. 1992. Elsevier Science Publishers Ltd. p. 1166.*

Fault Tree Analysis. Weibull. 1997 [retrieved on Sep. 25, 2017]. Retrieved from the Internet: <URL:http://www.weibull.com/basics/fault-tree>.*

* cited by examiner

AUTOMATED QUALIFICATION OF A SAFETY CRITICAL SYSTEM

FIELD

The present embodiments relate to automated qualification of a safety critical system including a plurality of system components.

TECHNICAL BACKGROUND

Safety critical systems, SCS, may include a plurality of interconnected components or subsystems. A safety critical system may be a complex safety critical system including a plurality of subsystems. Each subsystem may include software and/or hardware components. These complex safety critical systems may include embedded systems. There is a strong trend to interconnect formerly isolated embedded systems or subsystems to create open, adaptive and heterogeneous systems-of-systems (e.g., cyber-physical systems CPS). Since embedded systems or subsystems often implement safety-relevant functionalities, safety assurance is a major challenge in the design of safety critical systems SCS. Such a safety critical system SCS may include coupled embedded systems that interact spontaneously at runtime or where safety system operation is to be provided during runtime. Therefore, automatic construction of safety cases is to be provided to check if safety requirements are fulfilled.

Conventionally, safety analysis techniques are used during the development stage of the safety critical system. In order to support safety assessment during runtime of the safety critical system, safety analysis methodologies that enable an automatic generation of safety cases using component-based models are employed. Component fault trees, CFT, may be used for safety evaluation, which enables the reuse and modular composition of safety analysis models. However, component fault trees do not support an automatic construction of safety cases on a system level, since the failure modes of interacting components are to be connected by a user manually.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method and an apparatus for automated qualification of safety critical systems are provided.

According to a first aspect, a method for automated qualification of a safety critical system including a plurality of components is provided. A functional safety behavior of each component is represented by an associated component fault tree element. The method includes performing automatically a failure port mapping of output failure modes to input failure modes of component fault tree elements based on a predetermined generic fault type data model stored in a database.

In one embodiment of the method, the method includes selecting a component fault tree element of a component of the safety critical system to be qualified and identifying the component fault tree elements connected to the inports and outports of the selected component fault tree element.

In one embodiment of the method, the method further includes identifying within the failure type data model stored in the database names of failure types of the output failure modes of components connected to the inports of the selected component and names of failure types of the input failure modes of components connected to the outports of the selected component.

In one embodiment of the method, the method further includes identifying within the failure type data model the failure types of the output failure modes and the input failure modes of the selected component of the safety critical system to be qualified.

In a further embodiment of the method, the method further includes automatically connecting the output failure modes of outports of connected components with input failure modes of inports of the selected component of the safety critical system to be qualified and automatically connecting the input failure modes of inports of connected components with output failure modes of outports of the selected component of the safety critical system to be qualified using the identified names of failure types and relations of the predetermined failure type data model stored in the database.

In one embodiment of the method, the method further includes performing a fault tree analysis, FTA, based on the mapped failure modes.

In one embodiment of the method, the method further includes comparing results of the fault tree analysis, FTA, with safety targets of the safety critical system and qualifying the safety critical system if the safety targets are met.

In a possible embodiment of the method, the automated qualification of the safety critical system, SCS, is performed when planning the safety critical system.

In yet another embodiment of the method, the automated qualification of the safety critical system is performed during runtime of the safety critical system.

In a further possible embodiment of the method, the failure type data model is a hierarchical failure type data model including a plurality of failure type hierarchy levels.

In one embodiment of the method, connections between output failure modes and input failure modes are formed by logic connections representing an information flow between components of the safety critical system.

In a further embodiment of the method, connections between output failure modes and input failure modes are formed by logic connections representing an energy flow between components of the safety critical system.

In one embodiment of the method, the connections between output failure modes and input failure modes are formed by logic connections representing a fluid flow between components of the safety critical system.

In a further possible embodiment of the method, component fault tree elements are generated and/or loaded from a component fault tree, CFT, element library stored in a database.

In a still further possible embodiment of the method, the component fault tree, CFT, element of a component includes an internal fault tree logic modeling a failure propagation from an inport of the component fault tree element to an outport of the component fault tree element depending on internal basic events.

In one embodiment of the method, the internal fault tree logic of a component fault tree element includes logic gates.

One or more of the present embodiments provide an apparatus for automated qualification of a safety critical system having a plurality of components. A functional safety behavior of each component is represented by an associated component fault tree, CFT, element. The apparatus includes a failure port mapping unit adapted to perform automatically a failure port mapping of output failure modes to input failure modes of component fault tree, CFT, elements based on a predetermined generic failure type data model, FTDM, stored in a database.

In one embodiment of the apparatus, the failure port mapping unit includes a selection unit adapted to select a component fault tree, CFT, element of a component of the safety critical system, SCS, to be qualified and an identification unit adapted to identify the component fault tree, CFT, elements connected to the inports and outports of the selected component fault tree, CFT, element.

In a further possible embodiment of the apparatus, the identification unit is adapted to identify within the failure type data model, FTDM, stored in the database names of failure types of the output failure modes of components connected to the inports of the selected component. The identification unit is further adapted to identify names of failure types of the input failure modes of components connected to the outports of the selected component.

In a further embodiment of the apparatus, the identification unit is further adapted to identify within the failure type data model, FTDM, the failure types of the output failure modes and the input failure modes of the selected component of the safety critical system, SCS, to be qualified.

In a further embodiment of the apparatus, the failure port mapping unit includes a connecting unit adapted to automatically connect the output failure modes of outports of connected components with input failure modes of inports of the selected component of the safety critical system, SCS, to be qualified. The connecting unit is further adapted to automatically connect the input failure modes of inports of connected components with output failure modes of outports of the selected component of the safety critical system, SCS, to be qualified using the identified names of failure types and relations of the predetermined failure type data model stored in the database.

In one embodiment of the apparatus, the apparatus further includes an analyzing unit adapted to perform a fault tree analysis, FTA, based on the mapped failure modes.

In a further embodiment of the apparatus, the apparatus further includes an evaluation unit adapted to compare results of the fault tree analysis, FTA, with safety targets of the safety critical system, SCS, and adapted to qualify the safety critical system, SCS, if the safety targets are met by the comparison results.

One or more of the present embodiments further provide a safety critical system, SCS, including a plurality of components. The safety critical system, SCS, is adapted to be qualified by an apparatus according to the apparatus described above and below.

In one embodiment of the safety critical system, the safety critical system is a safety critical embedded system including hardware components and/or software components.

The present embodiments further provide, according to a further aspect, a computer program product including a non-transitory computer-readable storage medium storing instructions executable by one or more processors to perform the method described above and below.

BRIEF DESCRIPTION OF THE DRAWINGS

In the following, exemplary embodiments of different aspects of the present invention are described in more detail.

DETAILED DESCRIPTION

Figure 1:
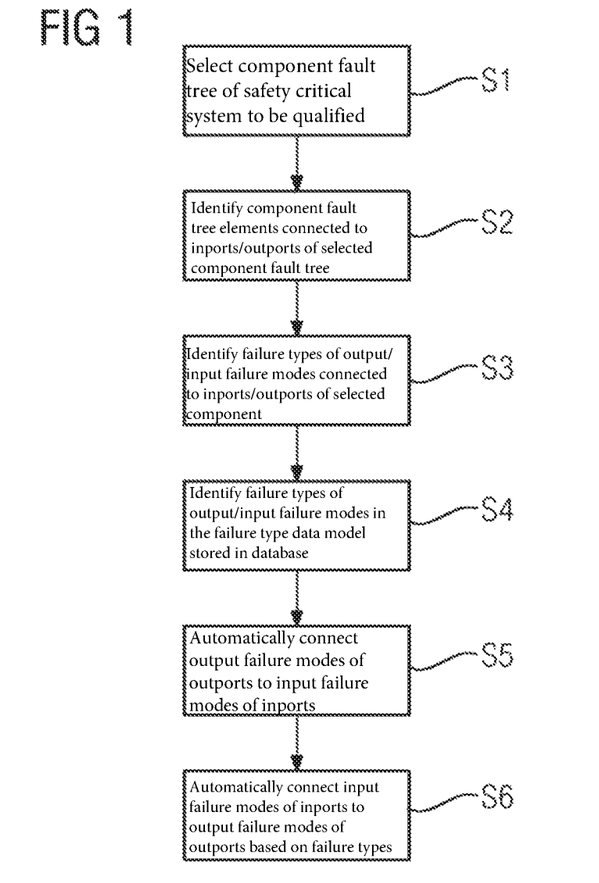
FIG. 1 shows a flowchart of an exemplary embodiment of a method for automated qualification of a safety critical system.
Figure 4:
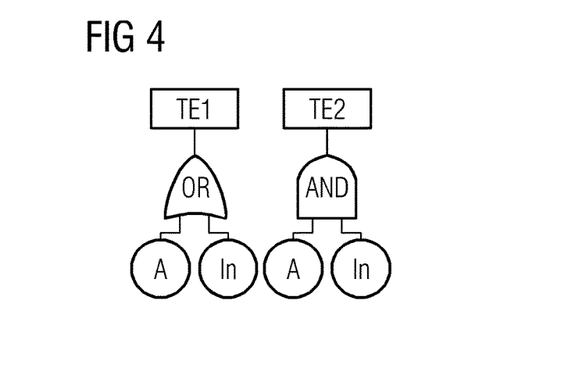
FIG. 4 shows a classic conventional fault tree.
Figure 5:
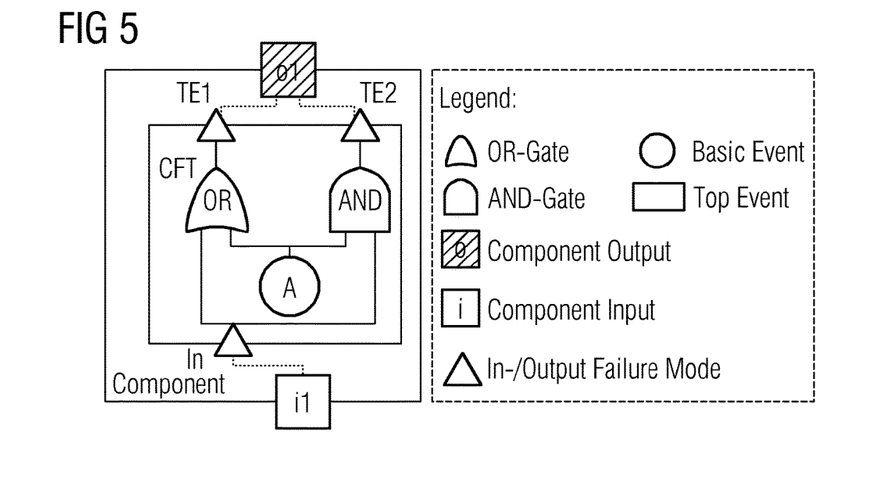
FIG. 5 shows a component fault tree illustrating the operation of the method and apparatus according to the present embodiments.

FIG. 1 shows a flowchart of a possible exemplary embodiment of a method for automated qualification of a safety critical system, SCS, according to a first aspect. The safety critical system, SCS, may be formed by an embedded system including a plurality of components c. The components may include hardware and/or software components. The functional safety behavior of each component c of the system, SCS, is represented by an associated component fault tree, CFT, element. The method according to the first aspect includes performing automatically a failure port mapping of output failure modes, OFMs, to input failure modes, IFMs, of component fault tree, CFT, elements based on a predetermined generic fault type data model, FTDM, stored in a database. The component fault tree, CFT, is a Boolean data model associated to system development elements such as components. The component fault tree, CFT, has the same expressive power as a classic fault tree. FIG. 4 shows an example of a classic conventional fault tree, and FIG. 5 shows an example of a component fault tree, CFT. As classic fault trees, component fault trees may also be used to model failure behavior of a safety critical system, SCS. This failure behavior is used to document that the respective system is safe and may also be used to identify drawbacks of the system design. In component fault trees, a separate component fault tree element is related to the respective component c of the safety critical system, SCS. Failures that are visible at the outport of a component are modeled using output failure modes, OFMs, which are related to the specific outport of the component fault tree, CFT, element. For modeling how specific failures propagate from an inport of a component c to an outport, input failure, IFMs, modes are used. The inner failure behavior that also influences the output failure modes is modeled using gates such as a NOT gate, an AND gate or an OR gate, and basic events, as also illustrated in FIG. 5. Every component fault tree, CFT, may be transformed to a classic fault tree by removing the input and output failure mode elements. FIG. 4 shows a classic fault tree, and FIG. 5 shows a component fault tree. In both trees, the top events or output events TE1 and TE2 are modeled. The component fault tree, CFT, model allows, additionally to the Boolean formulae that are also modeled within the classic fault tree, to associate the specific top events to the corresponding ports where the failures may appear. For example, in FIG. 5, the top event TE1 appears at port O1. By use of this methodology of components c also within fault tree models, benefits during the development may be observed (e.g., an increased maintainability of the safety analysis model of the safety critical system).

As illustrated in the flowchart of FIG. 1, the method may include in a possible embodiment a selection in act S1 of a component fault tree, CFT, element of a component of the safety critical system, SCS, to be qualified, and identifying in act S2 the component fault tree, CFT, elements connected to the inports and outports of the selected component fault tree element.

In act S3, names of failure types of output failure modes, OFMs, of components c connected to the inports of the selected component and names of failure types of the input failure modes, IFMs, of components c connected to the outports of the selected component are identified within the failure type data model stored in the database.

In act S4, the failure types of output failure modes, OFMs, and the input failure modes, IFMs, of the selected component c of the safety critical system, SCS, to be qualified are identified in the failure type data model stored in the database.

In act S5, the output failure modes, OFMs, of outports of connected components c are automatically connected with input failure modes, IFMs, of inports of the selected component c of the safety critical system, SCS, to be qualified.

In act S6, the input failure modes, IFMs, of inports of connected components c are automatically connected with output failure modes, OFMs, of outports of the selected component of the safety critical system, SCS, to be qualified using the identified names of failure types in relations of the predetermined failure type data model, FTDM, stored in the database.

Figure 2:
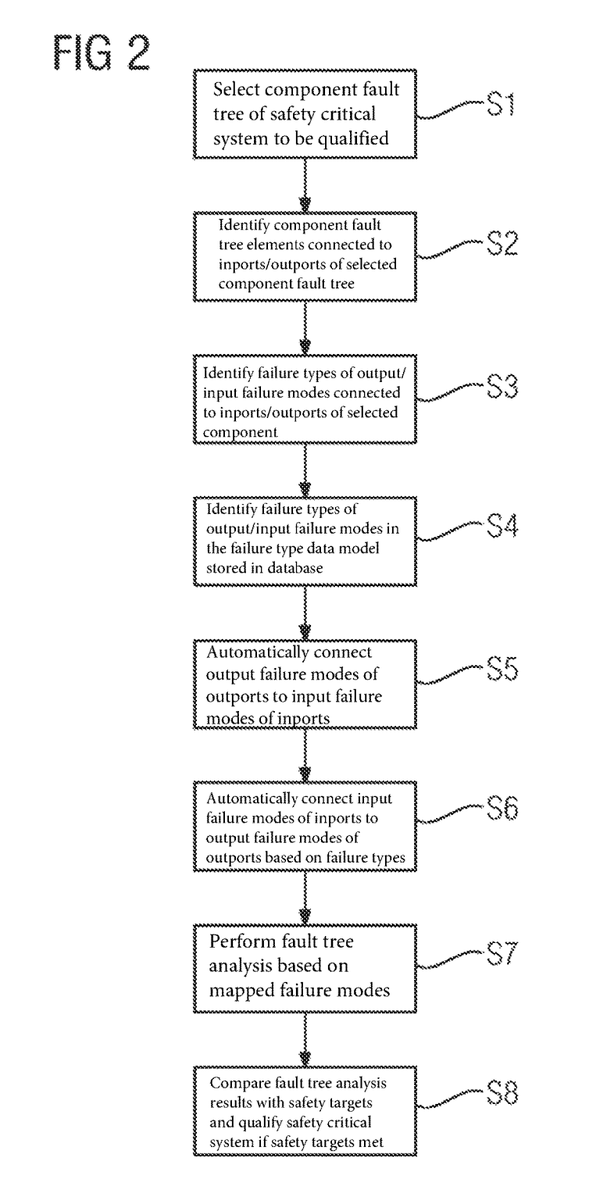
FIG. 2 shows a further flowchart illustrating an exemplary embodiment of a method for automated qualification of a safety critical system.

FIG. 2 shows a flowchart of a further possible exemplary embodiment of the method according to the first aspect. In the flowchart, the first six acts S1 to S6 are the same as the acts S1 to S6 illustrated in FIG. 1. As shows in FIG. 2, the method includes in the illustrated embodiment performing in act S7 a fault tree analysis, FTA, based on the mapped failure modes. In act S8, results of the fault tree analysis are compared with safety targets of the safety critical system, SCS, and the safety critical system, SCS, is qualified if the safety targets are met by the comparison results.

The automated qualification of the safety critical system, SCS, as illustrated in the embodiments of FIG. 1 or FIG. 2 may be performed when planning the safety critical system, SCS, or during runtime of the safety critical system, SCS.

Figure 6:
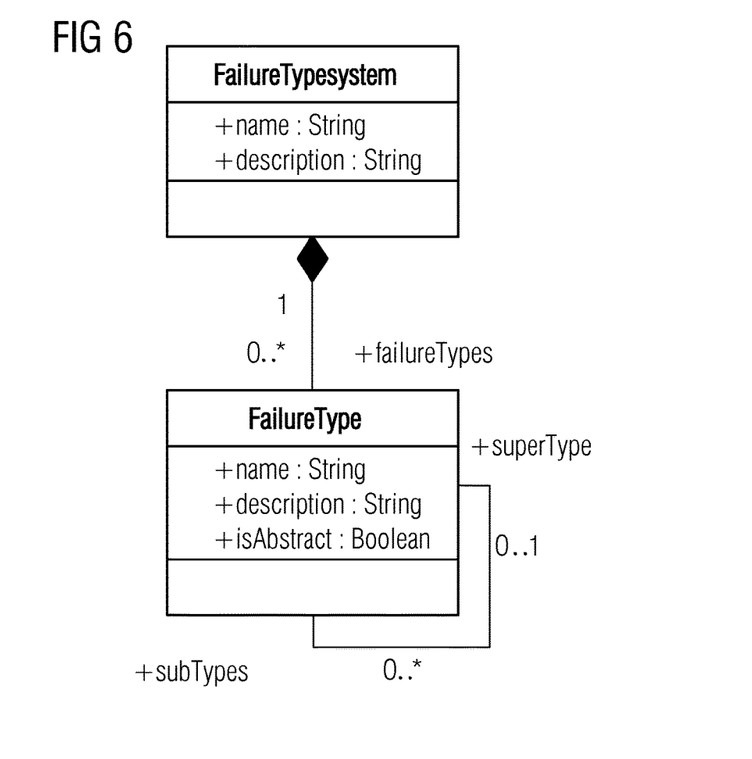
FIG. 6 illustrates a meta model of a failure type system that may be employed by the method and apparatus according to the present embodiments.
Figure 7:
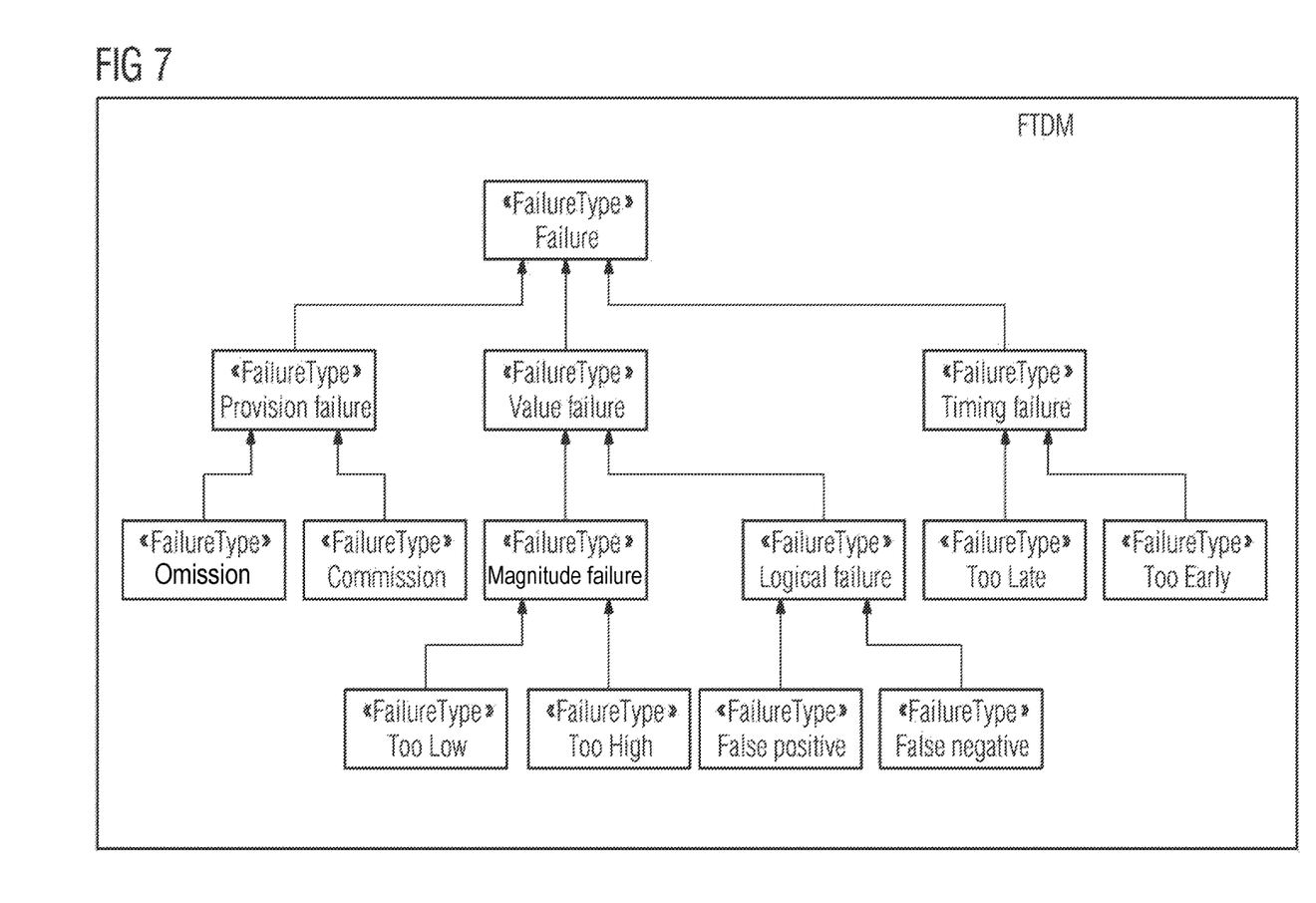
FIG. 7 illustrates an example for a generic failure type meta model that may be used by the method and apparatus according to the prevent embodiments.

The failure type data model used by the method according to one or more of the present embodiments is a hierarchical failure type data model, FTDM, including a plurality of failure type hierarchy levels. FIG. 6 illustrates a meta model of a failure type data model, FTDM, as employed by the method and apparatus according to the present embodiments. In order to define the semantics or failure modes defined in a fault tree or a component fault tree, for each input and output failure mode within the component fault tree, CFT, an unambiguous failure type is assigned. Different failure types as well as the relations between the different failure types may be specified in a failure type system, as illustrated in FIG. 6. A failure type data model, FTDM, may be defined in a generic way or the failure type data model, FTDM, may be adapted to every application scenario individually. FIG. 6 shows a meta model of a failure type system or failure type data model that may be used by the method and apparatus according to the present embodiments. The meta model includes an arbitrary number of failure types that are organized hierarchically. Each failure type has one single parent (e.g., supertype) and any number of children (e.g., subtypes). Thus, the failure type system, FTDM, as illustrated in FIG. 6, forms a tree of failure types. The parent of a failure type represents the generalization of this failure type, while children of the parent of the failure type represent a more detailed specification of the failure type. An example of a generic failure type system or failure type data model is illustrated in FIG. 7.

The connection between output failure modes, OFMs, and input failure modes, IFMs, is formed by logic connections representing a flow (e.g., an information flow, an energy flow or a fluid flow) between components c of the safety critical system, SCS, to be qualified. In one embodiment, the component fault tree, CFT, elements are generated and/or loaded from a component fault tree, CFT, element library stored in a further database. Each component fault tree, CFT, element may include an internal fault tree logic modeling a failure propagation from an inport of the component fault tree, CFT, element to an outport of the component fault tree element depending on internal basic events. The internal fault tree logic of a component fault tree element may include a plurality of logic gates.

Figure 8:
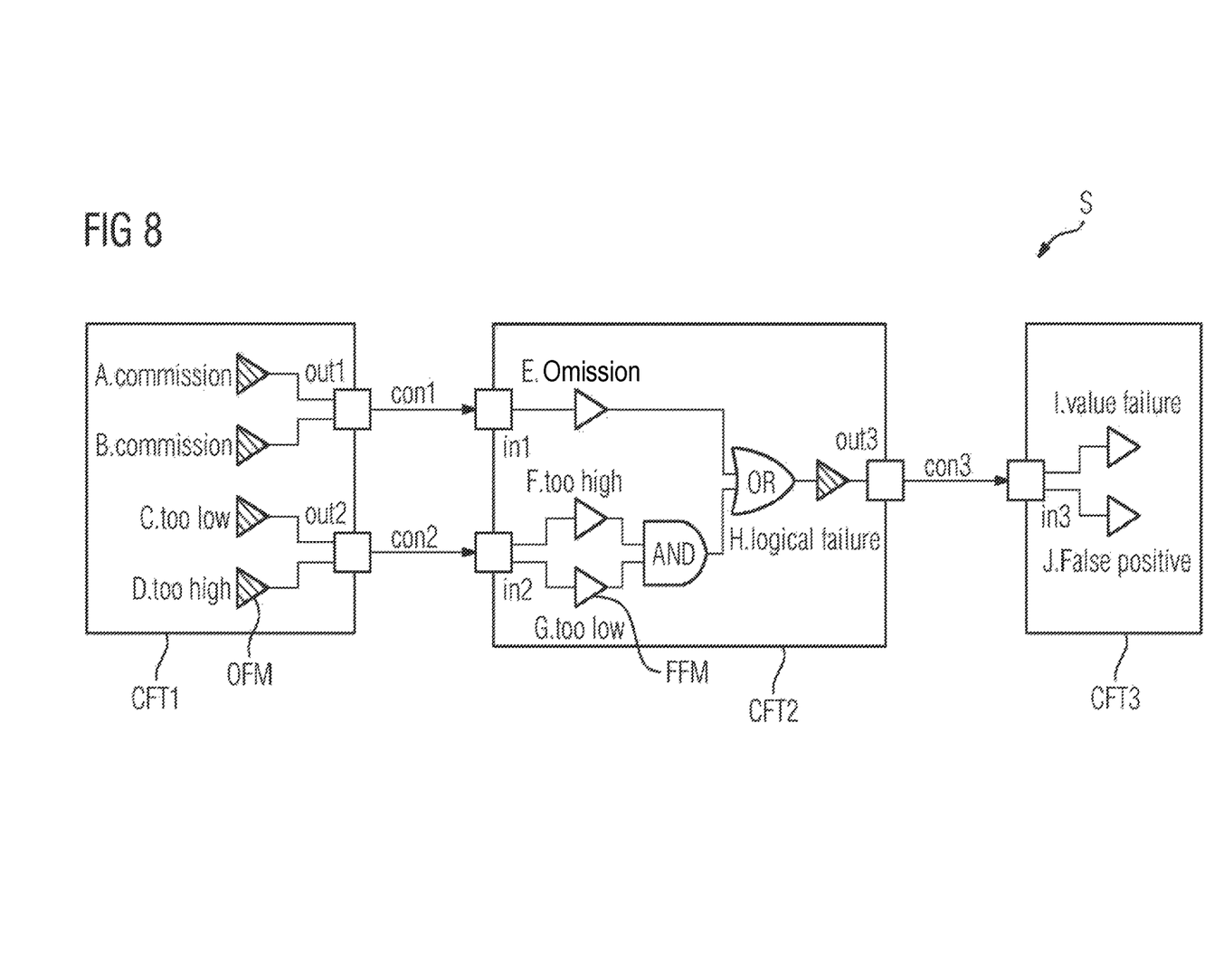
FIG. 8 shows an example of a system including components represented by interconnected component fault tree elements, as employed by the method and apparatus according to the present embodiments.

FIG. 8 illustrates an exemplary safety critical system, SCS, having components c that are represented by a component fault tree, CFT, element having outports and inports. Each component fault tree, CFT, element includes output failure modes, OFMs, connected to outports (OUT) of the respective component fault tree, CFT, element. Further, each component fault tree, CFT, element includes inports (IN) to which input failure modes, IFMs, are connected, as also illustrated in FIG. 8. The connection between the output failure modes, OFMs, and the input failure modes, IFMs, are logic connections representing any kind of flow within the safety critical system, SCS (e.g., an information flow, an energy flow or a fluid flow). In the example illustrated in FIG. 8, the component fault tree element CFT2 representing a second component c2 of the safety critical system, SCS, includes an internal fault tree logic modeling a failure propagation from inports to an outport, OUT3, depending on internal basic events. The internal fault tree logic of the component fault tree element CFT2 includes logic gates such as AND and OR gates, as illustrated in FIG. 8. A component fault tree, CFT, element may be associated to any hardware and/or software component of the safety critical system, SCS. Failures that are visible at an outport of the components c are modeled using output failure modes, OFMs, which are related to the specific outport. The inner failure behavior that also influences the output failure modes, OFMs, is modeled using logic gates and basic events.

Figure 3:
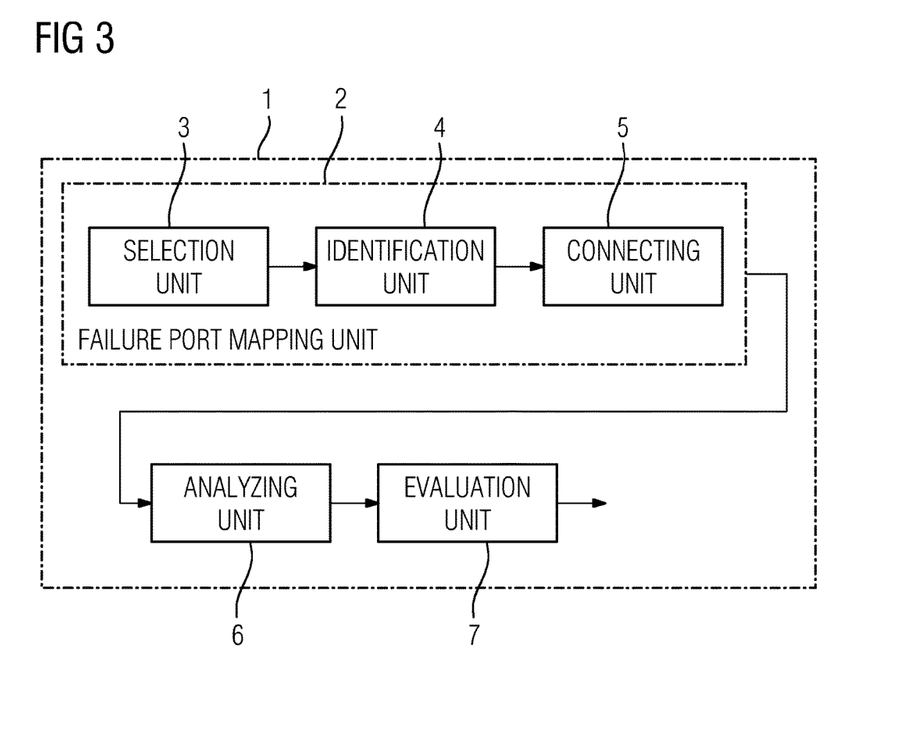
FIG. 3 shows a block diagram of an exemplary embodiment of an apparatus for automated qualification of a safety critical system.

FIG. 3 illustrates a possible exemplary embodiment of an apparatus 1 adapted to perform an automated qualification of a safety critical system, SCS, having a plurality of components c. The apparatus 1, as illustrated in FIG. 3, is adapted to perform an automatic qualification of a safety critical system, SCS, having a plurality of components c. The functional safety behavior of each component c is represented by an associated component fault tree, CFT, element that may be stored in a library or in a database.

As shown in FIG. 3, the apparatus 1 in the illustrated embodiment includes a failure port mapping unit 2 (e.g., a processor) adapted to perform automatically a failure port mapping, FPM, of output failure modes, OFMs, to input failure modes, IFMs, of component fault tree, CFT, elements based on a predetermined generic failure type data model, FTDM, stored in a database. In one embodiment, the failure port mapping unit 2 has access to a database where a predetermined generic failure type data model, FTDM, is stored. An example of such a generic failure type data model, FTDM, is illustrated in FIG. 7. The failure type data model, FTDM, is, in one embodiment, a hierarchical failure type data model, FTDM, including a plurality of failure type hierarchy levels, as also illustrated in FIG. 7. The failure type data model, FTDM, includes a root element to which other data elements of the next hierarchy level are connected. In the example shown in FIG. 7, omission is a provision failure that is a failure (e.g., root element). In the same manner, commission is also a provision failure that is a failure. The failure port mapping unit 2 is adapted to perform automatically a failure port mapping, FPM, of output failure modes, OFMs, to input failure modes, IFMs, of component fault tree, CFT, elements based on such a generic failure type data model, FTDM, as illustrated in FIG. 7.

In one embodiment, the failure port mapping unit 2 includes a selection unit 3 (e.g., the processor or another processor) adapted to select a component fault tree, CFT, element of a component c of the safety critical system, SCS, to be qualified, and an identification unit 4 (e.g., the processor or another processor) adapted to identify the component fault tree, CFT, elements connected to the inports and outports of the selected component fault tree element. The identification unit 4 may also be adapted to identify, within the failure type data model, FTDM, stored in the database, names of failure types of the output failure modes, OFMs, of components c connected to the inports of the selected component. The identification unit 4 is further adapted to identify names of failure types of the input failure modes, IFMs, of components connected to the outports of the selected component.

In one embodiment, the identification unit 4 is adapted to identify, within the failure type data model, FTDM, the failure types of the output failure modes, OFMs, and the input failure modes, IFMs, of the selected component of the safety critical system, SCS, to be qualified.

In the embodiment shown in FIG. 3, the failure port mapping, FPM, unit 2 further includes a connecting unit 5 (e.g., the processor or another processor). The connecting unit 5 is adapted to automatically connect the output failure modes, OFMs, of outports of connected components with input failure modes, IFMs, of inports of the selected component of the respective safety critical system, SCS, to be qualified. The connecting unit 5 is further adapted to automatically connect the input failure modes, IFMs, of inports of connected components with output failure modes, OFMs, of outports of the selected component of the safety critical system, SCS, to be qualified. For performing the automatic logic connection, the connecting unit 5 uses the identified names of failure types and relations of the predetermined failure type data model, FTDM, stored in the database.

In the embodiment illustrated in FIG. 3, the failure port mapping unit 2 is connected to an analyzing unit 6 (e.g., the processor or another processor) that is adapted to perform a fault tree analysis, FTA, based on the mapped failure modes provided by the failure port mapping unit 2. The qualification apparatus 1, as illustrated in FIG. 3, further includes an evaluation unit 7 (e.g., the processor or another processor) configured to compare results of the fault tree analysis, FTA, with safety targets of the safety critical system, SCS. The evaluation unit 7 is further adapted to qualify the safety critical system, SCS, if the safety targets are met by the comparison results.

The system S (e.g., a safety critical system, SCS) may include a set of components $C=\{c_1, \ldots, c_n\}$. Each component $c \in C$ includes a set of inports $IN(c)=\{in_1, \ldots, in_p\}$ and a set of outports $OUT(c)=\{out_1, \ldots, out_q\}$. The data flow between the outport of a component $c_1 \in C$ and the inport of another component $c_2 \in C$ (with $c_1 \neq c_2$) is represented by a set of connections $$CON=\{(out_x, in_y) | out_x \in OUT(c_1), in_y \in IN(c_2)\}$$

The exemplary system S presented in FIG. 8 is defined by:

$$C=\{c_1, c_2, c_3\} \tag{1}$$

$$IN(c_1)=\{\} \tag{2}$$

$$IN(c_2)=\{in_1, in_2\} \tag{3}$$

$$IN(c_3)=\{in_3\} \tag{4}$$

$$OUT(c_1)=\{out_1, out_2\} \tag{5}$$

$$OUT(c_2)=\{out_3\} \tag{6}$$

$$OUT(c_3)=\{\} \tag{7}$$

$$CON=\{(out_1, in_1),(out_2, in_2),(out_3, in_3)\} \tag{8}$$

Each component $c_i \in C$ has a component fault tree cft with $CFT(c_i)=cft_i$. CFT $CFT(c_i)$ of a component $c_i \in C$ may have input failure modes $IFM(in_k)=\{ifm_1, \ldots, ifm_s\}$ that are related to an inport $in_k \in IN(c_i)$ as well as output failure modes $OFM(out_l)=\{ofm_1, \ldots, ofm_r\}$ that are related to an outport $out_l \in OUT(c_i)$.

In the example in FIG. 8, the input and output failure modes related to the ports of the components are:

$$IFM(in_1)=\{E\} \tag{9}$$

$$IFM(in_2)=\{F,G\} \tag{10}$$

$$IFM(in_3)=\{I,J\} \tag{11}$$

$$OFM(out_1)=\{A,B\} \tag{12}$$

$$OFM(out_2)=\{C,D\} \tag{13}$$

$$OFM(out_3)=\{H\} \tag{14}$$

Each input and output failure has a failure type fty that is part of a defined failure type system T:

$$FTY(fm)=fty, \text{ with } fm \in \{ifm_1, \ldots, ifm_a, ofm_1, \ldots, ofm_b\}, fty \in T \tag{16}$$

Based on the failure type associated to a failure mode, the method and apparatus may automatically interconnect the failure modes of different components. If the output failure mode of a component $c_1$ has the same failure type as the input failure mode of another component $c_2$ and respective ports of the component $c_1$ and the other component $c_2$ may be connected:

$$\forall (out_i, in_j) \in CON \text{ with } out_i \in OUT(c_1), in_j \in IN(c_2) \rightarrow \{ \\ (ofm_k, in_1) | ofm_k \in OFM(out_i), ifm_l \in IFM(in_j) \text{ and} \\ FTY(ofm_k)=FTY(ifm_l)\} \tag{17}$$

Failure modes of different components c may be connected if the failure type of the input failure mode of component $c_2$ is a supertype of the failure type of the output failure mode of another component c with respect to the hierarchy of the failure type system T:

$$[\forall (out_i, in_j) \in CON \text{ with } out_i \in OUT(c_1), in_j \in IN(c_2)] \rightarrow \{ \\ (ofm_k, ifm_l) | ofm_k \in OFM(out_i), ifm_l \in IFM(in_j) \text{ and} \\ FTY(ifm_l) \in N_T^+(FTY(ofm_k))\} \text{ with} \\ N_T^+(fty_i)=\{fty_j | fty_j \text{ sup erType of } fty_i \in T\} \tag{18}$$

Since it is possible to propagate a failure of a more specific type from one failure mode to a failure mode with a more general type, these failure modes may be connected. However, a failure of a certain type may not be propagated to another failure mode with a more specialized failure type, even if the subtype relation in the used failure type system is existing.

In the example in FIG. 8, the following failure modes may be connected according to the approach using the failure type system presented in FIG. 7:

$$(out_1, in_1) \rightarrow \{(A,E)\} \quad (19)$$

$$(out_2, in_2) \rightarrow \{(C,G),(D,F)\} \quad (20)$$

$$(out_3, in_3) \rightarrow \{(H,I)\} \quad (21)$$

According to this example, the system S may not be qualified since E and J may not be connected. However, the system S may be qualified if E is of the type omission, and J is of the type value failure.

The method and apparatus according to one or more of the present embodiments may be used to connect failure modes automatically based on a failure type relation. This enables the automatic composition of arbitrary components in order to enable a system-wide safety analysis. Since with the method and apparatus according to one or more of the present embodiments the failure modes of the failure propagation model associated to each component c of the safety critical system, SCS, do not have to be connected manually, the designer may add, remove or exchange system components while the failure propagation model may be adapted accordingly in an automated way. Consequently, a system engineer gets immediate feedback on system-wide safety when performing changes in the architecture of the safety critical system, SCS, during the development process. For example, necessary changes due to safety related issues may be detected early and fixed more easily by the system designer. With the method and apparatus according to one or more of the present embodiments, an automated system-wide safety analysis may be performed during runtime of the safety critical system, SCS. Thus, runtime plug'n'play scenarios are possible for safety relevant systems. In the area of cyber-physical systems, CPS, for example, where various embedded systems interact spontaneously during runtime, the method and apparatus allow to qualify the cyber-physical system. With the method and apparatus according to one or more of the present embodiments, a runtime safety analysis may be employed. This runtime safety analysis may be applied to a heterogeneous system including a plurality of subsystems.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for automated qualification of a safety critical system comprising a plurality of components, wherein each component of the plurality of components is a hardware component, a software component, or a hardware and software component, wherein a functional safety behavior of each component of the plurality of components is represented by an associated component fault tree element, the method comprising:
automatically performing, by a processor, a failure port mapping of output failure modes to input failure modes of component fault tree elements based on a predetermined fault type data model, stored in a database, wherein the failure port mapping is automatically performed when one of the output failure modes of one of the component fault tree elements has a same failure type as one of the input failure modes of another one of the component fault tree elements; and
qualifying, by the processor, the safety critical system based on the mapped failure modes, wherein qualifying comprises performing a fault tree analysis based on the mapped failure modes and qualifying the safety critical system when results of the fault tree analysis indicate that the failure types of the output failure modes of the component fault tree elements are propagated to either a same failure type or a more general failure type of the input failure modes of the component fault tree elements.

2. The method of claim 1, further comprising:
selecting a component fault tree element of a component of the plurality of components of the safety critical system to be qualified; and
identifying the component fault tree elements connected to the inports and outports of the selected component fault tree element.

3. The method of claim 2, further comprising:
identifying within the failure type data model stored in the database names of the failure types of the output failure modes of components connected to the inports of the selected component and names of the failure types of the input failure modes of components connected to the outports of the selected component.

4. The method of claim 3, further comprising:
identifying within the failure type data model, the failure types of the output failure modes and the input failure modes of the selected component of the safety critical system to be qualified.

5. The method of claim 4, further comprising:
automatically connecting the output failure modes of outports of connected components with input failure modes of inports of the selected component of the safety critical system to be qualified; and
automatically connecting the input failure modes of inports of connected components with output failure modes of outports of the selected component of the safety critical system to be qualified using the identified names of failure types and relations of the predetermined failure type data model stored in the database.

6. The method of claim 1, wherein the automated qualification of the safety critical system is performed when planning the safety critical system, during runtime of the safety critical system, or when planning the safety critical system and during runtime of the safety critical system.

7. The method of claim 1, wherein the failure type data model is a hierarchical failure type data model comprising a plurality of failure type hierarchy levels.

8. The method of claim 1, wherein connections between output failure modes and input failure modes are logic connections representing an information flow, an energy flow or a fluid flow between components of the safety critical system.

9. The method of claim 1, wherein the database is a first database, and
wherein component fault tree elements are generated, loaded, or generated and loaded from a component fault tree element library stored in a second database.

10. The method of claim 1, wherein the component fault tree element of a component of the plurality of components comprises an internal fault tree logic modeling a failure propagation from an inport of the component fault tree element to an outport of the component fault tree element depending on internal basic events.

11. The method of claim 10, wherein the internal fault tree logic of a component fault tree element comprises logic gates.

12. The method of claim 1, further comprising providing, by the processor, system-wide safety feedback on the safety critical system, wherein the system-wide safety feedback is indicative of whether the safety critical system is qualified.

13. An apparatus for automated qualification of a safety critical system having a plurality of components, wherein each component of the plurality of components is a hardware component, a software component, or a hardware and software component, wherein a functional safety behavior of each component of the plurality of components is represented by an associated component fault tree element, the apparatus comprising:
a memory storing a database; and
a processor in communication with the memory and configured to:
automatically perform a failure port mapping of output failure modes to input failure modes of component fault tree elements based on a predetermined failure type data model stored in the database, wherein the failure port mapping is automatically performed when one of the output failure modes of one of the component fault tree elements has a same failure type as one of the input failure modes of another of the component fault tree elements; and
qualify the safety critical system based on the mapped failure modes, wherein the qualification of the safety critical system based on the mapped failure modes comprises performance of a fault tree analysis based on the mapped failure modes and qualification of the safety critical system when results of the fault tree analysis indicate that the failure types of the output failure modes of the component fault tree elements are propagated to either a same failure type or a more general failure type of the input failure modes of the component fault tree elements.

14. The apparatus of claim 13, wherein the processor is further configured to:
select a component fault tree element of a component of the plurality of components of the safety critical system to be qualified; and
identify the component fault tree elements connected to inports and outports of the selected component fault tree element.

15. The apparatus of claim 14, wherein the processor is further configured to:

identify within the failure type data model stored in the database names of the failure types of the output failure modes of components connected to the inports of the selected component; and
identify names of the failure types of the input failure modes of components connected to the outports of the selected component.

16. The apparatus of claim 15, wherein the processor is further configured to identify within the failure type data model the failure types of the output failure modes and the input failure modes of the selected component of the safety critical system to be qualified.

17. The apparatus of claim 16, wherein the processor is further configured to:
automatically connect the output failure modes of outports of connected components with input failure modes of inports of the selected component of the safety critical system to be qualified; and
automatically connect the input failure modes of inports of connected components with output failure modes of outports of the selected component of the safety critical system to be qualified using the identified names of failure types and relations of the predetermined failure type data model stored in the database.

18. The apparatus of claim 13, wherein the automated qualification of the safety critical system is performed when planning the safety critical system, during runtime of the safety critical system, or when planning the safety critical system and during runtime of the safety critical system.

19. The apparatus of claim 13, wherein the processor is further configured to provide system-wide safety feedback on the safety critical system, wherein the system-wide safety feedback is indicative of whether the safety critical system is qualified.

20. A safety critical system comprising:
a plurality of components, wherein each component of the plurality of components is a hardware component, a software component, or a hardware and software component, wherein the safety critical system is qualifiable by an apparatus for automated qualification,
wherein a functional safety behavior of each component of the plurality of components is represented by an associated component fault tree element, the apparatus comprising a memory storing a database, and a processor in communication with the memory and configured to automatically perform a failure port mapping of output failure modes to input failure modes of component fault tree elements based on a predetermined failure type data model stored in the database and qualify the safety critical system based on the mapped failure modes, wherein the failure port mapping is automatically performed when one of the output failure modes of one of the component fault tree elements has a same failure type as one of the input failure modes of another one of the component fault tree elements, wherein the qualification of the safety critical system comprises performance of a fault tree analysis based on the mapped failure modes and qualification of the safety critical system when results of the fault tree analysis indicated that the failure types of the output failure modes of the component fault tree elements are propagated to either a same failure type or a more general failure type of the input failure modes of the component fault tree elements.

21. The safety critical system of claim 20, wherein the safety critical system is a safety critical embedded system comprising hardware components, software components, or the hardware components and the software components.

22. The safety critical system of claim 20, wherein the qualification of the safety critical system is performed when planning the safety critical system, during runtime of the safety critical system, or when planning the safety critical system and during runtime of the safety critical system.

23. A non-transitory computer-readable storage medium storing instructions executable by one or more processors to automatically qualify a safety critical system comprising a plurality of components, wherein each component of the plurality of components is a hardware component, a software component, or a hardware and software component, wherein a functional safety behavior of each component of the plurality of components is represented by an associated component fault tree element, the instructions comprising:

automatically performing a failure port mapping of output failure modes to input failure modes of component fault tree elements based on a predetermined fault type data model, stored in a database, wherein the failure port mapping is automatically performed when one of the output failure modes of one of the component fault tree elements has a same failure type as one of the input failure modes of another one of the component fault tree elements; and qualifying the safety critical system based on the mapped failure modes, wherein qualifying comprises performing a fault tree analysis based on the mapped failure modes and qualifying the safety critical system when results of the fault tree analysis indicated that the failure types of the output failure modes of the component fault tree elements are propagated to either a same failure type or a more general failure type of the input failure modes of the component fault tree elements.

* * * * *